(12) United States Patent
Wakasugi et al.

(10) Patent No.: US 12,469,251 B2
(45) Date of Patent: Nov. 11, 2025

(54) COATING REGION LEARNING DEVICE, COATING REGION LEARNING METHOD, COATING REGION PREDICTION DEVICE, AND COATING REGION PREDICTION METHOD

(71) Applicant: ASICS CORPORATION, Hyogo (JP)

(72) Inventors: Shinsaku Wakasugi, Hyogo (JP); Takashi Yamade, Hyogo (JP); Naoto Iwashita, Hyogo (JP); Shin Watanabe, Hyogo (JP)

(73) Assignee: ASICS CORPORATION, Hyogo (JP)

( * ) Notice: Subject to any disclaimer, the term of this patent is extended or adjusted under 35 U.S.C. 154(b) by 243 days.

(21) Appl. No.: 18/029,877

(22) PCT Filed: Oct. 27, 2020

(86) PCT No.: PCT/JP2020/040234
§ 371 (c)(1),
(2) Date: Mar. 31, 2023

(87) PCT Pub. No.: WO2022/091212
PCT Pub. Date: May 5, 2022

(65) Prior Publication Data
US 2023/0274524 A1 Aug. 31, 2023

(51) Int. Cl.
*G06V 10/44* (2022.01)
*G06V 10/776* (2022.01)

(52) U.S. Cl.
CPC ............ *G06V 10/44* (2022.01); *G06V 10/776* (2022.01)

(58) Field of Classification Search
CPC ........ G06V 10/44; G06V 10/776; A43D 1/08; A43D 25/18; G06N 3/08
See application file for complete search history.

(56) References Cited

U.S. PATENT DOCUMENTS

| 2013/0132038 A1 | 5/2013 | Regan et al. |
| 2019/0191845 A1 | 6/2019 | Sasaki |

FOREIGN PATENT DOCUMENTS

| CN | 110710759 A | 1/2020 |
| JP | 6014786 B1 | 10/2016 |
| JP | 2019113972 A | 7/2019 |
| JP | 6664768 B1 | 3/2020 |

OTHER PUBLICATIONS

"Yuan-Ping Luh et al., A Smart Manufacturing Solution for Multi-Axis Dispenser Motion Planning in Mixes Production of Shoe Soles, Mar. 2020, International Journal of Precision Engineering and Manufacturing—Green Technology, 7:769-779" (Year: 2020).*

(Continued)

*Primary Examiner* — Michael Horabik
*Assistant Examiner* — Phuong Hau Cai
(74) *Attorney, Agent, or Firm* — Global IP Counselors, LLP (57) ABSTRACT

An application area learning device, includes a learning unit configured to perform machine learning on a correlation between a feature value at least inside a contour to be extracted from an outline image of a shoe component and an application area of an adhesive in the shoe component and generate a prediction model, and a learned model storage unit configured to store the prediction model.

18 Claims, 5 Drawing Sheets

(56) References Cited

OTHER PUBLICATIONS

"Mauro S. Costa et al., 3D Object Recognition and Pose with Relational Indexing, Sep. 2000, Computer Vision and Image Understanding, vol. 79, Issue 3, pp. 364-407" (Year: 2000).*
"Felice Andrea Pellegrino et. al., Edge Detection Revisited, Jun. 2004, IEEE Transactions on Systems, Man, and Cybernetics—Part B: CyberNetics, vol. 34, No. 3" (Year: 2004).*
"M. Brejl et al., Object Localization and Border Detection Criteria Design in Edge-Based Image Segmentation: Automated Learning from Examples, Oct. 2000, IEEE Transactions on Medical Imaging, vol. 19, Issue 10" (Year: 2000).*
"Zhongxu Hu et. al., Automatic Surface Roughing with 3D Machine Vision and Cooperative Robot Control, Jan. 2007, ScienceDirect , Robotics and Autonomous Systems 55 (2007) 552-560" (Year: 2007).*
"Kim K., Y., CAD-based automated robot programming in adhesive spray systems for shoe outsoles and uppers, 2004, Journal of Robotic Systems, 21[11], 625-634" (Year: 2004).*
"S.V. Kamarthi, Accelerating Neural Network Training Using Weight Extrapolations, Nov. 1999, Neural Networks, vol. 12, Issue 9, 1285-1299" (Year: 1999).*
Supplementary European Search Report issued Sep. 27, 2023 in corresponding European Application No. 20959730.1.
International Search Report issued Jan. 12, 2021 in corresponding International Application No. PCT/JP2020/040234.
International Preliminary Report on Patentability issued May 2, 2023 in corresponding International Application No. PCT/JP2020/040234.

\* cited by examiner

COATING REGION LEARNING DEVICE, COATING REGION LEARNING METHOD, COATING REGION PREDICTION DEVICE, AND COATING REGION PREDICTION METHOD

CROSS-REFERENCE TO RELATED APPLICATION

This application is a U.S. National Stage application of International Application No. PCT/JP2020/040234, filed Oct. 27, 2020, the contents of which is hereby incorporated by reference.

TECHNICAL FIELD

The present disclosure relates to a technology for learning an application area and a technology for predicting an application area.

BACKGROUND INFORMATION

In the manufacturing process of workpieces, such as shoes, an area to be processed needs to be accurately recognized. Accordingly, a worker visually determines the area to be processed or performs "marking out" of drawing lines on the surface of the material. Such work requires workforce, which hinders labor savings in the production process and makes it difficult to introduce automated production using industrial robots.

For example, in the process of attaching a sole to an upper portion of a shoe, a worker determines an area in the upper portion where an adhesive is to be applied and moves a robot arm to the application area to apply the adhesive.

Japanese Patent No. 6014786 discloses a conventional adhesive application system for shoes, in which the outline of the shadow of a shoe component illuminated by a backlight is recognized, an application trajectory for application of an adhesive to the bottom surface of the shoe component is set on the basis of the outline, and a movement mechanism is controlled such that an adhesive application part moves along the application trajectory, so that the adhesive application part applies the adhesive to the bottom surface of the shoe component.

SUMMARY

It has been determined that in the conventional method of recognizing the outline of a workpiece based on three-dimensional information or captured images thereof to determine the area to be processed, it is difficult to recognize with high accuracy a variety of workpieces.

The present disclosure has been made in view of such a problem, and a purpose thereof is to provide a technology for learning and predicting an application area with high accuracy.

To solve the problem above, an application area learning device according to one aspect of the present disclosure includes a learning unit that performs machine learning on a correlation between a feature value at least inside a contour extracted from an outline image of a shoe component and an application area of an adhesive in the shoe component and generates a prediction model, and a learned model storage unit that stores the prediction model.

Another aspect of the present disclosure relates to an application area prediction device. The device includes a learned model storage unit that stores a prediction model generated by performing machine learning on a correlation between a feature value at least inside a contour extracted from an outline image of a shoe component and an application area of an adhesive in the shoe component, and a prediction unit that predicts, based on the prediction model, an application area from a feature value at least inside a contour extracted from an outline image of a shoe component and outputs the application area.

Yet another aspect of the present disclosure relates to an application area learning method. In the method, a computer performs machine learning on a correlation between a feature value at least inside a contour extracted from an outline image of a shoe component and an application area of an adhesive in the shoe component and generates a prediction model.

Still yet another aspect of the present disclosure relates to an application area prediction method. In the method, based on a prediction model generated by performing machine learning on a correlation between a feature value at least inside a contour extracted from an outline image of a shoe component and an application area of an adhesive in the shoe component, a computer predicts an application area from a feature value at least inside a contour extracted from an outline image of a shoe component and outputs the application area.

Optional combinations of the aforementioned constituting elements, and implementation of the present invention in the form of methods, apparatuses, systems, computer programs, data structures, and recording media can also be practiced as additional modes of the present invention.

The present disclosure provides embodiments of the invention that enable learning and prediction of an application area with high accuracy.

DETAILED DESCRIPTION

Figure 1:
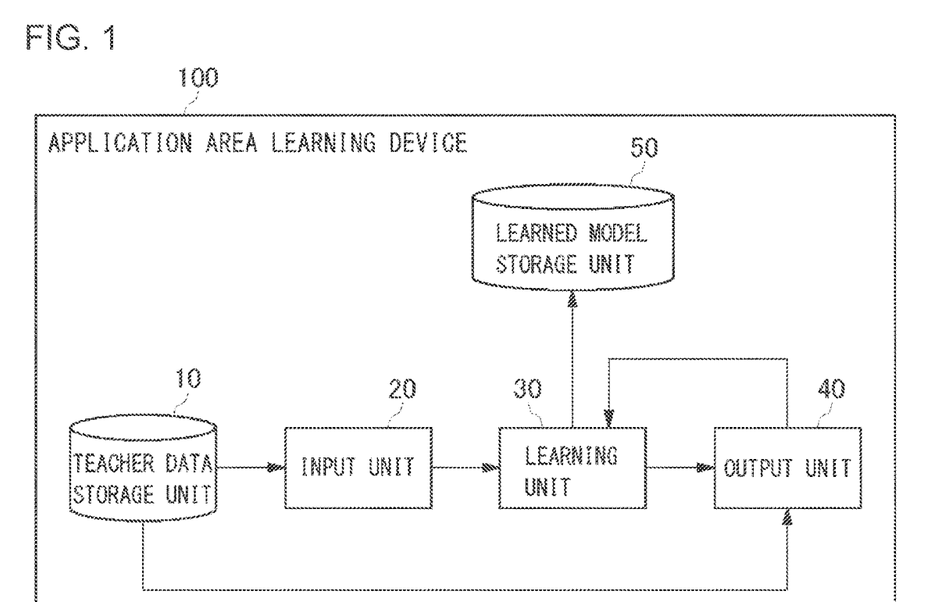
FIG. 1 is a configuration diagram of an application area learning device according to the present embodiment.

FIG. 1 is a configuration diagram of an application area learning device 100 according to the present embodiment. The application area learning device 100 includes a teacher data storage unit 10, an input unit 20, a learning unit 30, an output unit 40, and a learned model storage unit 50. FIG. 1 is a block diagram featuring the functions, and these functional blocks can be implemented in a variety of forms by hardware, software, or a combination thereof.

The teacher data storage unit 10 stores, as teacher data, a pair of a feature value within a contour extracted from an outline image of a shoe component and an adhesive application area in the shoe component.

The shoe component can be, as an example, a shoe upper portion, and the outline image is an image obtained by capturing an image of the application surface of the upper portion from a normal direction of the application surface or from a direction that forms a predetermined angle to the normal direction of the application surface. Especially, in the case of shoes with cup soles, such as running shoes, an adhesive is applied not only to the bottom surface of the upper portion but also to the side surfaces thereof; accordingly, it is desirable to use, as the outline image, an image captured from an oblique direction that makes a predetermined angle to the normal direction of the bottom surface.

The "feature value within a contour extracted from an outline image" as used herein includes a feature value at least inside a contour extracted from an outline image and can also include, in addition thereto, a feature value of the contour itself.

The feature values within a contour extracted from an outline image include, for example, edge data indicating a change of a predetermined threshold or greater in the luminance value between adjacent pixels within the contour, height data of a pixel within the contour, or both. The height data of a pixel within the contour as used herein is height information of a point corresponding to the pixel within the contour but is not essential information as a feature value within the contour. The feature values within a contour extracted from an outline image can further include, in addition thereto, pixel values (such as the color value and grayscale value) of a pixel within the contour.

The input unit 20 reads the teacher data of a feature value within a contour from the teacher data storage unit 10 and supplies the teacher data to the learning unit 30.

The learning unit 30 performs machine learning on a correlation between a feature value within a contour extracted from an outline image of a shoe component and an adhesive application area in the shoe component so as to generate a prediction model for an application area.

As an example of machine learning, a multilayer neural network model is used. Into the input layer of a multilayer neural network model, a feature value within a contour extracted from an outline image is input as an explanatory variable. From the output layer of the multilayer neural network model, an objective variable (output data) indicating whether or not it is an application area is output. Accordingly, weights of connections between the layers of the neural network are learned by deep learning so that the error between the application area data of the correct answer data and the output data output from the output layer is minimized.

The learning unit 30 inputs the feature value within the contour supplied from the input unit 20 to the neural network and supplies prediction data of an application area output from the neural network to the output unit 40.

The output unit 40 reads the teacher data of an adhesive application area from the teacher data storage unit 10. The output unit 40 then supplies, to the learning unit 30, the error between the teacher data of the application area and the prediction data of the application area output from the learning unit 30.

The learning unit 30 adjusts the weights of each layer of the neural network so that the error supplied from the output unit 40 is minimized. The learning unit 30 then stores, as the prediction model for an application area, the learned neural network by which the error with respect to a set of the feature value within the contour and the teacher data of the application area has been minimized, in the learned model storage unit 50.

Figure 2:
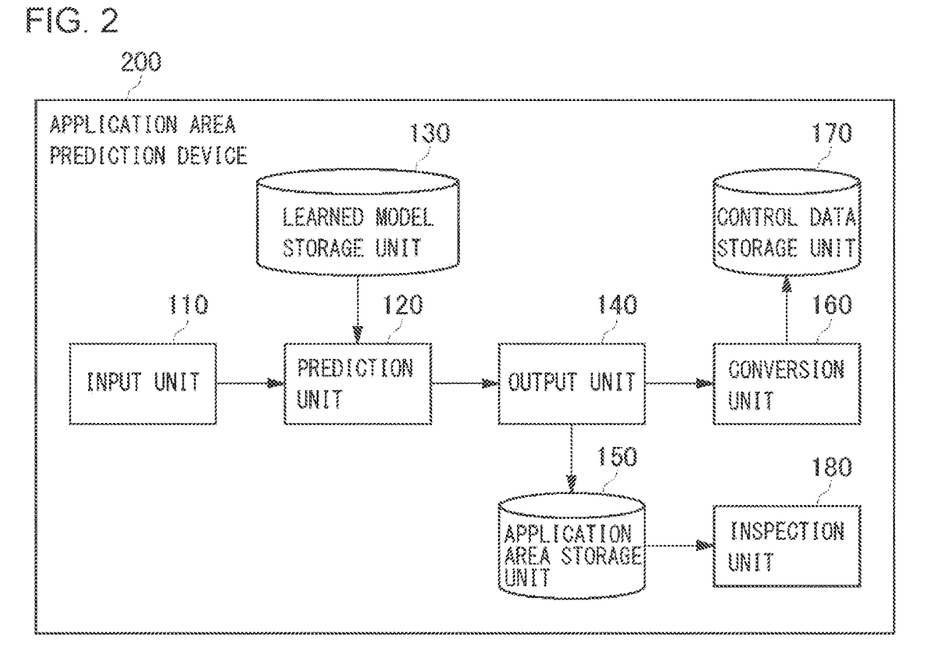
FIG. 2 is a configuration diagram of an application area prediction device according to the present embodiment.

The prediction model stored in the learned model storage unit 50 is used as a prediction model for estimating an application area from a feature value within a contour extracted from an outline image of an unknown shoe component, in an application area prediction device 200 described later.

FIG. 2 is a configuration diagram of the application area prediction device 200 according to the present embodiment. The application area prediction device 200 includes an input unit 110, a prediction unit 120, a learned model storage unit 130. an output unit 140, an application area storage unit 150, a conversion unit 160, a control data storage unit 170, and an inspection unit 180. FIG. 2 is a block diagram featuring the functions, and these functional blocks can be implemented in a variety of forms by hardware, software, or a combination thereof.

The learned model storage unit 130 stores a prediction model generated by the application area learning device 100. The prediction model is generated by performing machine learning on a correlation between a feature value within a contour extracted from an outline image of a shoe component and an adhesive application area in the shoe component, and an example of the prediction model is a learned multilayer neural network model.

The input unit 110 provides, as input data, a feature value within a contour extracted from an outline image of an unknown shoe component, to the prediction unit 120.

Based on the prediction model stored in the learned model storage unit 130, the prediction unit 120 predicts an application area from the input feature value within the contour extracted from the outline image of the shoe component and provides the application area to the output unit 140. In specific, the feature value within the contour extracted from the outline image is provided as the input data to a learned multilayer neural network model, and information indicating an application area is obtained as the output data.

The output unit 140 stores the application area information predicted by the prediction unit 120 in the application area storage unit 150 and also provides the application area information to the conversion unit 160.

The conversion unit 160 adds height data of the application surface of the shoe component to the two-dimensional coordinate data of pixels representing the respective points in the predicted application area, so as to generate three-dimensional coordinate data of each point in the application area. Based on the three-dimensional coordinate data of the application area, the conversion unit 160 also generates data used to control a robot arm for applying an adhesive to the application area and stores the data in the control data storage unit 170. The control data includes application trajectory data that indicates the trajectory of the robot arm moving to apply the adhesive to the application area. The application trajectories include a trajectory of circling the contour of the application area before moving within the application area, and a trajectory of moving in a zigzag pattern in the application area.

The inspection unit 180 reads the predicted application area from the application area storage unit 150 and compares an actual application area applied by the robot arm or the like with the predicted application area to judge whether or not the adhesive has been applied appropriately. By comparing a captured image of the actual application area and the predicted application area, whether the actual applied area extends out beyond or falls short of the predicted application area is judged. Also for such judgement on appropriate application, machine learning can be used.

Figure 3A:
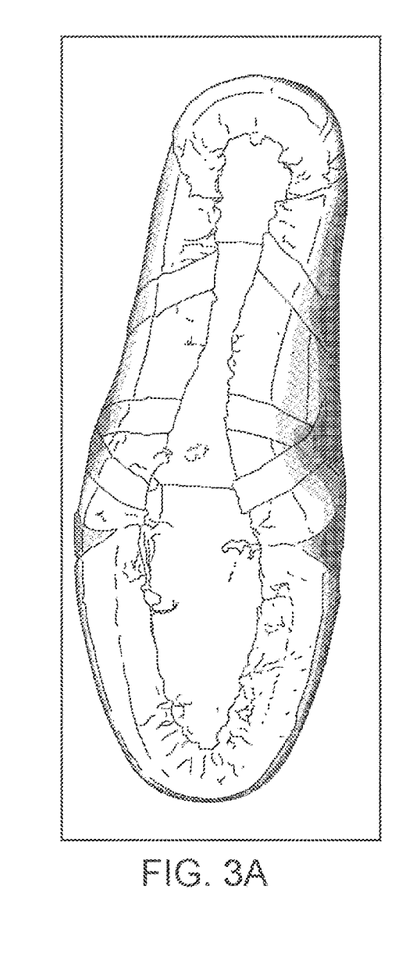
FIGS. 3A-3C are diagrams that each show a feature value within a contour extracted from an outline image of a shoe component.
Figure 3B:
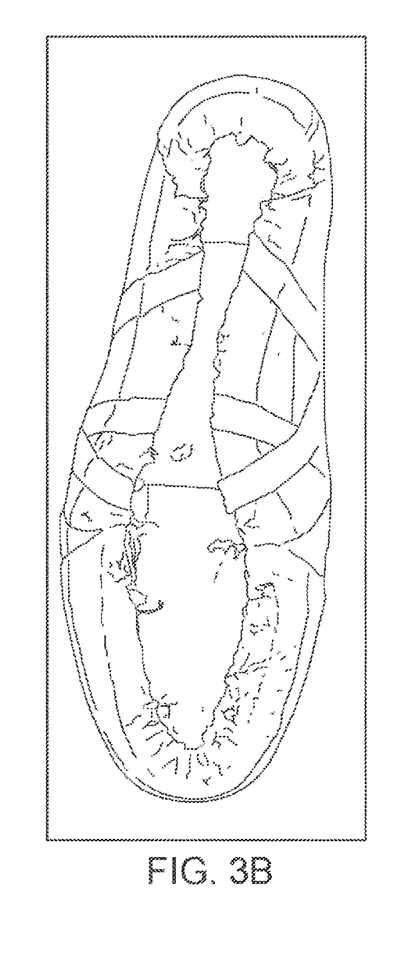
Figure 3C:
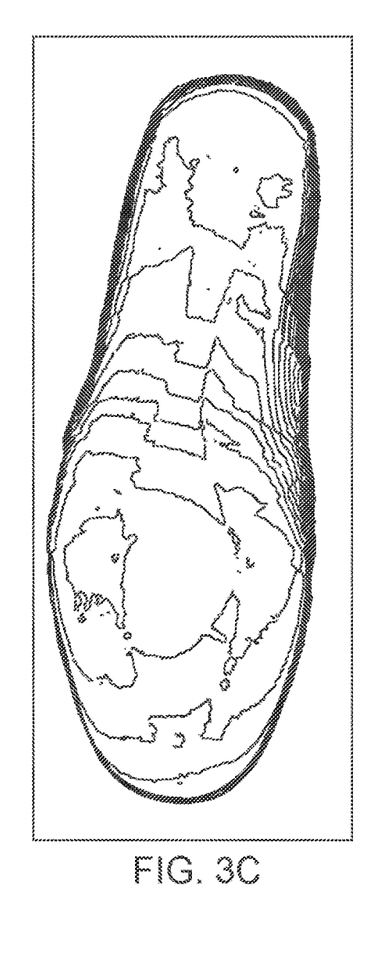

FIGS. 3A-3C are diagrams that each show a feature value within a contour extracted from an outline image of a shoe component. Here, the case of using a shoe upper portion as an example of the shoe component will be described.

A shoe includes an upper portion and a sole as components. The sole has an almost definite shape, whereas the upper portion is generally rounded and curved and can have an indefinite shape due to molding errors and deformation, and hence, individual differences are likely to appear.

FIG. 3A is an outline image of an upper portion captured from the direction facing the application surface, i.e., from the hack side of the shoe. In this case, the feature value within the contour extracted from the outline image of the upper portion is a pixel value (such as the color value or grayscale value) of a pixel within the contour.

FIG. 3B is an image obtained by extracting edges that each indicate a change of a predetermined threshold or greater in the luminance value between adjacent pixels in the outline image of FIG. 3A. In this case, the feature value within the contour extracted from the outline image of the upper portion is edge data indicating a change of a predetermined threshold or greater in the luminance value between adjacent pixels within the contour.

FIG. 3C is an image that shows contour lines within the contour in the outline image of FIG. 3A. A contour line as used herein is a line that connects pixels of the same height within the contour. In this case, the feature value within the contour extracted from the outline image of the upper portion is height data of a pixel within the contour. Besides the contour line image within the contour as shown in FIG. 3C, the height data can be a depth image that contains the depth value of each pixel within the contour.

The feature value within a contour extracted from an outline image to be provided as teacher data to the learning unit 30 of the application area learning device 100 shown in FIG. 1 is the edge data within the contour as shown in FIG. 3B or the height data of pixels within the contour as shown in FIG. 3C. As the teacher data, the color values or grayscale values of pixels within the contour as shown in FIG. 3A can be further provided to the learning unit 30.

Figure 4:
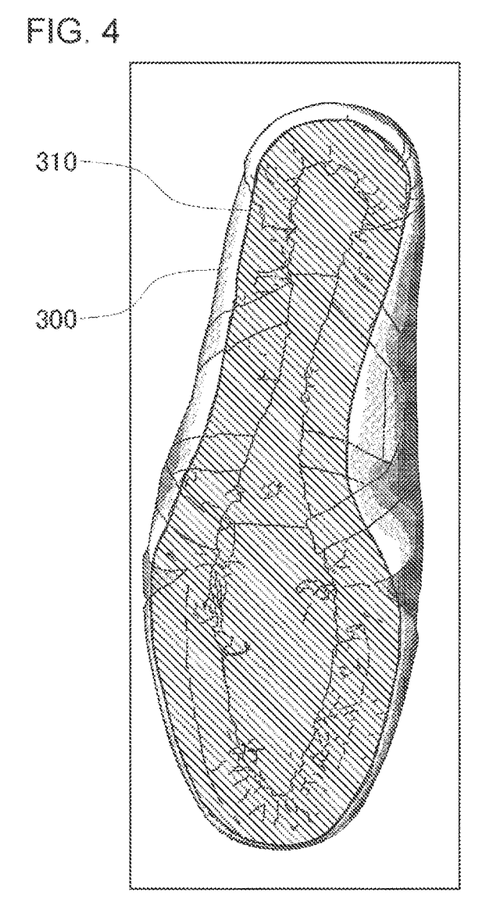
FIG. 4 is a diagram that shows an adhesive application area in the shoe component.

FIG. 4 is a diagram that shows an adhesive application area in the shoe component. In the image of the bottom surface of the upper portion similar to FIG. 3A, a diagonally shaded area denoted by the reference sign 310 is an application area where an adhesive should be applied in the upper portion. It should be noted that, since the upper portion is rounded, an outline 300 of the upper portion partially extends out of the application area 310. It should also be noted that the application area 310 is not flat but is curved at the arch such as to conform to the shape of a foot. In other words, the application area 310 in which the robot arm should move is defined not only by the two-dimensional coordinates but also by the three-dimensional coordinates including height.

The application area 310 can be created and provided by a skilled processor of shoe components, for example, with respect to the outline 300 of a certain shoe component, based on his or her experience and know-how.

In FIG. 4, the application area 310 is shown as a general image with color information. However, in the application area information used as teacher data, the color information can be ignored, and data indicating whether or not it is within the application area with 0 or 1 can also be used. Also, the application area information can be provided in the form of a point cloud, which is a set of points representing the application area in a two-dimensional coordinate system. The application area information is used as teacher data that indicates the correct answer of output data in the learning unit 30 of the application area learning device 100 shown in FIG. 1.

Figure 5:
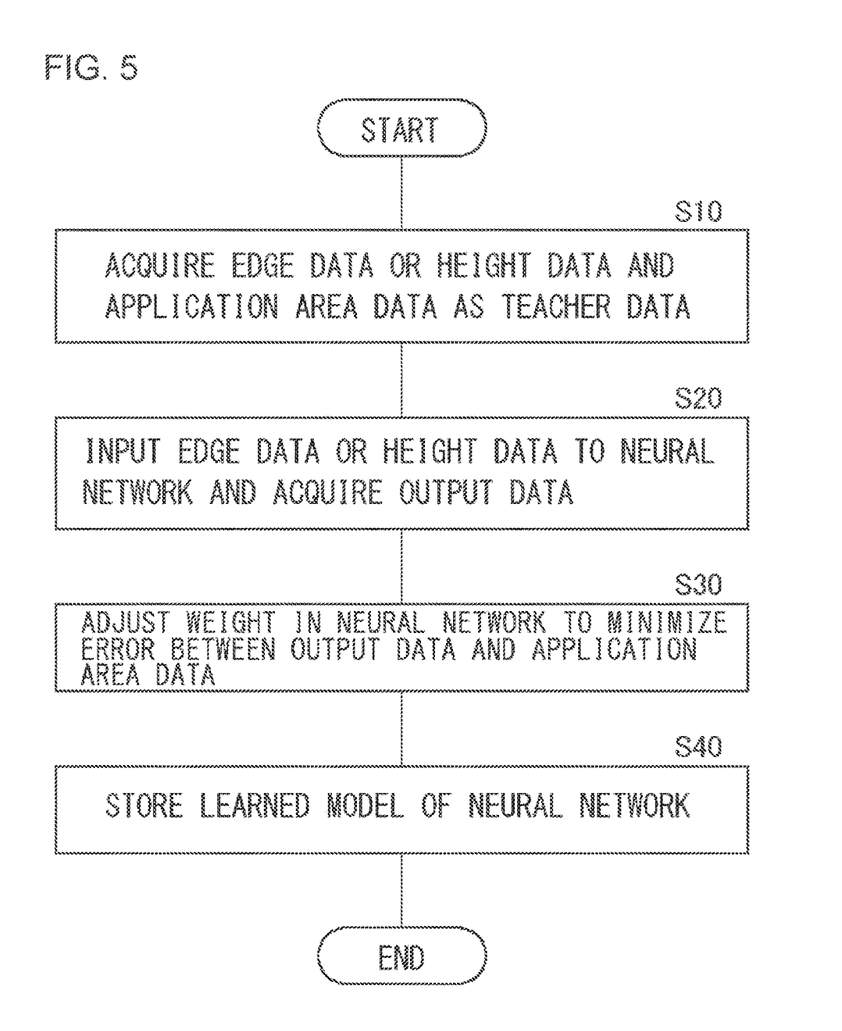
FIG. 5 is a flowchart that shows a procedure of learning a prediction model for an application area, performed by the application area learning device shown in FIG. 1.

FIG. 5 is a flowchart that shows a procedure of learning a prediction model for an application area, performed by the application area learning device 100 shown in FIG. 1.

The input unit 20 of the application area learning device 100 acquires, as teacher data, edge data or height data of pixels within a contour extracted from an outline image of a shoe component, and the output unit 40 acquires application area data as teacher data (S10).

The learning unit 30 inputs, to a neural network, the edge data or height data acquired from the input unit 20 and acquires output data (S20).

The output unit 40 feeds back, to the learning unit 30, an error between the output data acquired from the learning unit 30 and the application area data acquired as correct answer teacher data, and the learning unit 30 adjusts a parameter, such as a weight in the neural network, to minimize the error (S30).

The learning unit 30 stores the learned model of the neural network in the learned model storage unit 50 (S40).

Figure 6:
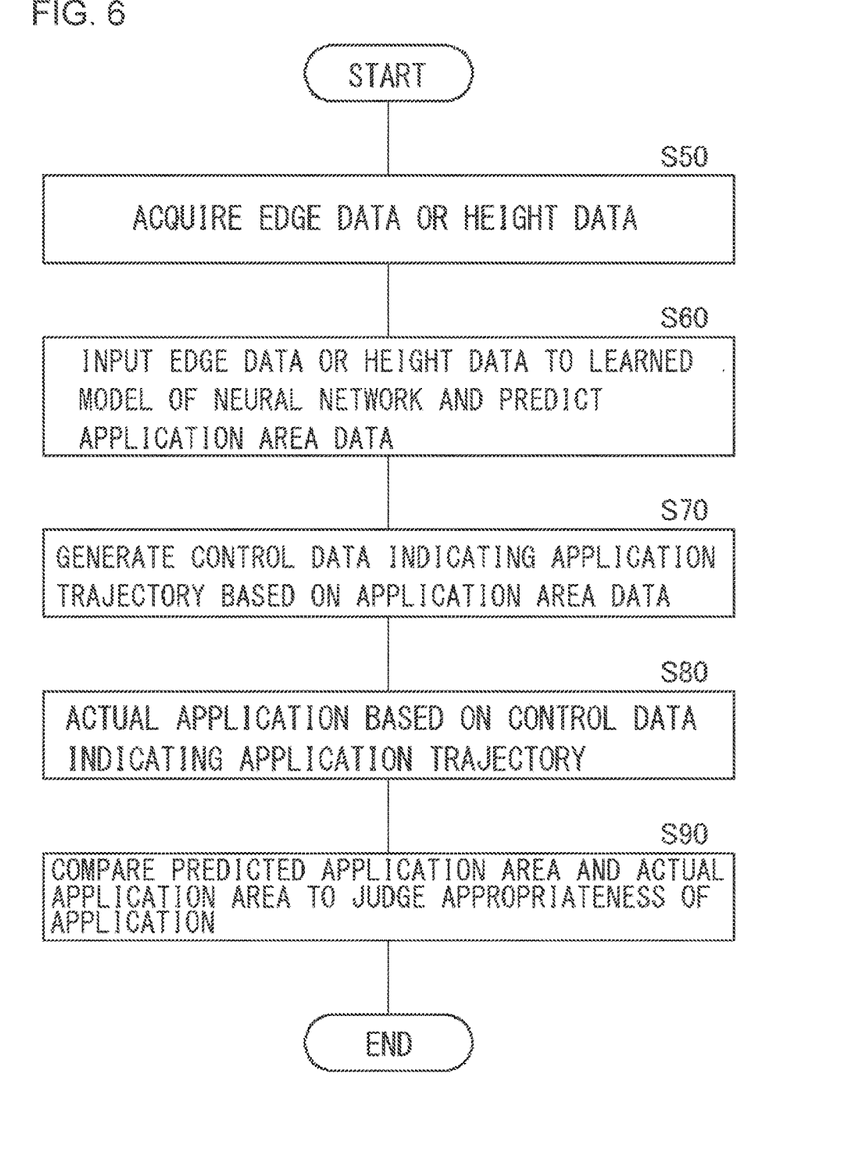
FIG. 6 is a flowchart that shows a procedure of prediction and judgment of an application area, performed by the application area prediction device shown in FIG. 2.

FIG. 6 is a flowchart that shows a procedure of prediction and judgment of an application area performed by the application area prediction device 200 shown in FIG. 2.

The input unit 110 of the application area prediction device 200 acquires edge data or height data of pixels within a contour extracted from an outline image of a shoe component (S50).

The prediction unit 120 inputs the edge data or height data acquired from the input unit 110 to a learned model of a neural network and predicts application area data (S20).

The conversion unit 160 generates control data indicating an application trajectory of a robot arm based on the predicted application area data (S70).

Based on the control data indicating the application trajectory, the robot arm is moved and controlled to apply an adhesive to the application area (S80).

The inspection unit 180 compares the predicted application area and the actual application area to judge whether or not the adhesive has been applied appropriately (S90).

Through experiments, the prediction accuracy has been evaluated by comparing the correct application area and the predicted application area. The prediction accuracy was evaluated by calculating an error rate by dividing the sum of the area of the portion of the predicted application area that extends out of the correct application area and the area by which the predicted application area falls short of the correct application area, by the area of the correct application area.

As a result, sufficient prediction accuracy was confirmed when only the pixel values (such as the color values or grayscale values) of pixels within the contour of an outline image were used as teacher data to learn the application area or when the edge data or height data were used as teacher data to learn the application area. In particular, using the edge data as teacher data contributes to improvement of the prediction accuracy.

Also, when the edge data or height data and the pixel values (such as the color values or grayscale values) of pixels within the contour were used in combination as teacher data, the prediction accuracy was further improved, compared to the case where the edge data or height data was used as teacher data. Further, the prediction accuracy is expected to be improved when the edge data and height data are used in combination as teacher data, compared to the case where only one of the edge data or height data is used as teacher data.

As described above, with the application area learning device 100 of the present embodiment, a highly accurate learned model for predicting the application area can be generated by machine learning using the edge data or height data extracted from an image of a shoe component and the application area as teacher data. Also, with the application area prediction device 200 of the present embodiment, the application area can be predicted with high accuracy by extracting the edge data or height data from an image of a shoe component to be processed and inputting the edge data or height data to a generated learned model. Accordingly, the "marking out" process can be omitted, enabling automation of the visual judgment.

In particular, the application area can be learned and predicted not only for shoe parts having definite shapes for which feature points can be set easily, such as soles, but also in consideration of a variety of shoe parts having indefinite shapes for which feature points cannot be set easily, such as upper portions. The application area in an upper portion, which is ambiguous and of which boundaries are difficult to determine by means of image recognition, can be extracted with high accuracy. By increasing the learning data, a variety of shoes can be dealt with, so that the versatility can be improved.

Also, by automatically generating the control data for the robot arm based on a predicted application area, the time required for shoe production can be reduced, and the processing quality can be improved.

The present invention has been described with reference to an embodiment. The embodiment is intended to be illustrative only, and it will be obvious to those skilled in the art that various modifications to a combination of constituting elements or processes could be developed and that such modifications also fall within the scope of the present invention.

Although a feature value within a contour is extracted from an outline image of a shoe component in the description above, a feature value within a contour can be extracted from three-dimensional data of a shoe component.

The present invention is applicable to a technology for learning and predicting an application area.

The invention claimed is:

1. An application area learning device, comprising:
a learning processor that performs machine learning on a correlation between a feature value at least inside a contour to be extracted from an outline image of a bottom surface of an upper portion of a shoe and an application area of an adhesive in the upper portion of the shoe and generates a prediction model; and
a learned model storage medium that stores the prediction model;
the machine learning including a multilayer neural network and weights of connections between layers of the neural network, the weights learned by deep learning so that an error between application area data of correct answer data and output data output from an output layer of the neural network is minimized;
the minimizing is performed by adjusting the weights of each layer of the neural network so that the error supplied from the output layer is minimized;
the learned neural network by which the error with respect to the feature value within the contour and the application area data has been minimized is stored for estimating the application area from the feature value within the contour extracted from the outline image of an unknown shoe component, in an application area prediction device.

2. The application area learning device according to claim 1, wherein the feature value at least inside the contour to be extracted from the outline image includes edge data indicating a change of a predetermined threshold or greater in the luminance value between adjacent pixels at least inside the contour.

3. The application area learning device according to claim 2, wherein the feature value at least inside the contour to be extracted from the outline image further includes a color value or a grayscale value of a pixel at least inside the contour.

4. The application area learning device according to claim 2, wherein the feature value at least inside the contour to be extracted from the outline image includes height data of a pixel at least inside the contour.

5. The application area learning device according to claim 2, wherein the outline image is an image to be obtained by capturing an image of an application surface of the upper portion from a normal direction of the application surface or from a direction forming a predetermined angle to the normal direction of the application surface.

6. The application area learning device according to claim 3, wherein the outline image is an image to be obtained by capturing an image of an application surface of the upper portion from a normal direction of the application surface or from a direction forming a predetermined angle to the normal direction of the application surface.

7. The application area learning device according to claim 1, wherein the feature value at least inside the contour to be extracted from the outline image includes height data of a pixel at least inside the contour.

8. The application area learning device according to claim 7, wherein the feature value at least inside the contour to be extracted from the outline image further includes a color value or a grayscale value of a pixel at least inside the contour.

9. The application area learning device according to claim 7, wherein the outline image is an image to be obtained by capturing an image of an application surface of the upper portion from a normal direction of the application surface or from a direction forming a predetermined angle to the normal direction of the application surface.

10. The application area learning device according to claim 1, wherein the outline image is an image to be obtained by capturing an image of an application surface of the upper portion from a normal direction of the application surface or from a direction forming a predetermined angle to the normal direction of the application surface.

11. An application area prediction device, comprising:
a learned model storage medium that stores a prediction model generated by performing machine learning on a correlation between a feature value at least inside a contour extracted from an outline image of a bottom surface of an upper portion of a shoe and an application area of an adhesive in the upper portion of the shoe; and
a prediction processor that predicts, based on the prediction model, the application area from the feature value at least inside the contour extracted from the outline image of a shoe component and outputs the application area;
the machine learning including a multilayer neural network and weights of connections between layers of the neural network, the weights learned by deep learning so that an error between application area data of correct answer data and output data output from an output layer of the neural network is minimized;

the minimizing is performed by adjusting the weights of each layer of the neural network so that the error supplied from the output layer is minimized;

the learned neural network by which the error with respect to the feature value within the contour and the application area data has been minimized is stored for estimating the application area from the feature value within the contour extracted from the outline image of an unknown shoe component, in the application area prediction device.

12. The application area prediction device according to claim 11, further comprising a conversion processor that generates control data indicating an application trajectory in a predicted application area.

13. The application area prediction device according to claim 12, further comprising an inspection processor that compares an actual application area with a predicted application area to judge appropriateness.

14. The application area prediction device according to claim 11, further comprising an inspection processor that compares an actual application area with a predicted application area to judge appropriateness.

15. An application area learning method in which a computer is configured to perform machine learning on a correlation between a feature value at least inside a contour extracted from an outline image of a bottom surface of an upper portion of a shoe and an application area of an adhesive in the upper portion of the shoe and generates a prediction model;

the machine learning including a multilayer neural network and weights of connections between layers of the neural network, the weights learned by deep learning so that an error between application area data of correct answer data and output data output from an output layer of the neural network is minimized;

the minimizing is performed by adjusting the weights of each layer of the neural network so that the error supplied from the output layer is minimized;

the learned neural network by which the error with respect to the feature value within the contour and the application area data has been minimized is stored for estimating the application area from the feature value within the contour extracted from the outline image of an unknown shoe component, in the application area prediction device.

16. An application area prediction method comprising, based on a prediction model generated by performing machine learning on a correlation between a feature value at least inside a contour extracted from an outline image of a bottom surface of an upper portion of a shoe and an application area of an adhesive in the upper portion of the shoe, predicting with a computer the application area from the feature value at least inside the contour extracted from the outline image of a shoe component and outputs outputting the application area;

the machine learning including a multilayer neural network and weights of connections between layers of the neural network, the weights learned by deep learning so that an error between application area data of correct answer data and output data output from an output layer of the neural network is minimized;

the minimizing is performed by adjusting the weights of each layer of the neural network so that the error supplied from the output layer is minimized;

the learned neural network by which the error with respect to the feature value within the contour and the application area data has been minimized is stored for estimating the application area from the feature value within the contour extracted from the outline image of an unknown shoe component, in an application area prediction device.

17. A non-transitory computer readable medium storing an application area learning program causing a computer to perform machine learning on a correlation between a feature value at least inside a contour extracted from an outline image of a bottom surface of an upper portion of a shoe and an application area of an adhesive in the upper portion of the shoe and generate a prediction model;

the machine learning including a multilayer neural network and weights of connections between layers of the neural network, the weights learned by deep learning so that an error between application area data of correct answer data and output data output from an output layer of the neural network is minimized;

the minimizing is performed by adjusting the weights of each layer of the neural network so that the error supplied from the output layer is minimized;

the learned neural network by which the error with respect to the feature value within the contour and the application area data has been minimized is stored for estimating the application area from the feature value within the contour extracted from the outline image of an unknown shoe component, in an application area prediction device.

18. A non-transitory computer readable medium storing an application area prediction program causing a computer to predict, based on a prediction model generated by performing machine learning on a correlation between a feature value at least inside a contour extracted from an outline image of a bottom surface of an upper portion of a shoe and an application area of an adhesive in the upper portion of the shoe, the application area from the feature value at least inside the contour extracted from the outline image of a shoe component and to output the application area;

the machine learning including a multilayer neural network and weights of connections between layers of the neural network, the weights learned by deep learning so that an error between application area data of correct answer data and output data output from an output layer of the neural network is minimized;

the minimizing is performed by adjusting the weights of each layer of the neural network so that the error supplied from the output layer is minimized;

the learned neural network by which the error with respect to the feature value within the contour and the application area data has been minimized is stored for estimating the application area from the feature value within the contour extracted from the outline image of an unknown shoe component, in an application area prediction device.

* * * * *